(12) United States Patent
Wang (10) Patent No.: US 12,126,909 B2
(45) Date of Patent: Oct. 22, 2024

(54) CAMERA MODULE, ELECTRONIC DEVICE, AND METHOD FOR CONTROLLING CAMERA MODULE

(71) Applicant: VIVO MOBILE COMMUNICATION CO., LTD., Dongguan (CN)

(72) Inventor: Zhisheng Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 190 days.

(21) Appl. No.: 17/866,826

(22) Filed: Jul. 18, 2022

(65) Prior Publication Data
US 2022/0353421 A1  Nov. 3, 2022

Related U.S. Application Data

(63) Continuation of application No. PCT/CN2021/072904, filed on Jan. 20, 2021.

(30) Foreign Application Priority Data

Jan. 22, 2020 (CN) .......................... 202010076068.3

(51) Int. Cl.
*H04N 23/69* (2023.01)
*G02B 7/02* (2021.01)
(Continued)

(52) U.S. Cl.
CPC ............ *H04N 23/69* (2023.01); *G02B 7/021* (2013.01); *G02B 7/08* (2013.01); *G03B 30/00* (2021.01);
(Continued)

(58) Field of Classification Search
None
See application file for complete search history.

(56) References Cited

U.S. PATENT DOCUMENTS 3,882,269 A * 5/1975 Niehaus ............. H04N 7/17318
348/E7.071
4,215,373 A * 7/1980 Goldenberg ......... H04N 9/3141
348/789

(Continued)

FOREIGN PATENT DOCUMENTS

CN 204733195 U 10/2015
CN 208739253 U 4/2019
(Continued)

OTHER PUBLICATIONS

Extended European Search Report issued in related European Application No. 21743729.2, mailed Jun. 23, 2023, 8 pages.
(Continued)

*Primary Examiner* — Cynthia Segura
(74) *Attorney, Agent, or Firm* — IPX PLLC (57) ABSTRACT

A camera module, an electronic device, and a camera module control method are provided. The camera module includes: a first bracket; a lens, where the lens is disposed on the first bracket; a camera assembly, where the camera assembly includes a camera and a second bracket, the camera is disposed on the second bracket, the second bracket is slidably sleeved on the first bracket, and an optical axis direction of the lens is parallel to an optical axis direction of the camera.

15 Claims, 3 Drawing Sheets

(51) Int. Cl.
*G02B 7/08* (2021.01)
*G03B 30/00* (2021.01)
*H04N 23/51* (2023.01)
*H04N 23/54* (2023.01)
*H04N 23/55* (2023.01)
*H04N 23/61* (2023.01)
*H04N 23/62* (2023.01)
*H04N 23/667* (2023.01)

(52) U.S. Cl.
CPC .............. *H04N 23/51* (2023.01); *H04N 23/54* (2023.01); *H04N 23/55* (2023.01); *H04N 23/61* (2023.01); *H04N 23/62* (2023.01); *H04N 23/667* (2023.01)

(56) References Cited

U.S. PATENT DOCUMENTS

| | | |
|---|---|---|
| 9,723,196 B2 | 8/2017 | Eshita |
| 10,218,905 B2 | 2/2019 | Eromaki et al. |
| 2004/0116166 A1 | 6/2004 | Makishima |
| 2005/0101348 A1 | 5/2005 | Wang |
| 2005/0185297 A1 | 8/2005 | Omiya et al. |
| 2009/0028547 A1* | 1/2009 | Yang ............... H04N 23/55 396/512 |

FOREIGN PATENT DOCUMENTS

| | | |
|---|---|---|
| CN | 110445918 A | 11/2019 |
| CN | 111263041 A | 6/2020 |
| JP | 2019012149 A | 1/2019 |

OTHER PUBLICATIONS

International Search Report issued in corresponding International Application No. PCT/CN2021/072904, mailed Apr. 9, 2021, 4 pages.
First Office Action issued in related Chinese Application No. 202010076068.3, mailed Jan. 4, 2021, 6 pages.
Examination Report issued in related Indian Application No. 202217045155, mailed Dec. 1, 2023, 6 pages.
Notice of Reasons for Refusal issued in related Japanese Application No. 2022-539634, mailed Nov. 14, 2023, 4 pages.

* cited by examiner

FIG. 6 ically high. A camera module is used as an example, and a photographing capability of the electronic device becomes an important standard for measuring the performance of the electronic device. With the continuous development of the camera module of the electronic device, a quantity of cameras of the camera module is developed from a single camera to multiple cameras, so that the camera module can implement a zooming effect, and therefore, a photographing effect of the camera module is better.

CAMERA MODULE, ELECTRONIC DEVICE, AND METHOD FOR CONTROLLING CAMERA MODULE

CROSS-REFERENCE TO RELATED APPLICATIONS

This application is a continuation of International Application No. PCT/CN2021/072904, filed Jan. 20, 2021, which claims priority to Chinese Patent Application No. 202010076068.3, filed Jan. 22, 2020. The entire contents of each of the above-referenced applications are expressly incorporated herein by reference.

TECHNICAL FIELD

The present disclosure relates to the field of communications device technologies, and in particular, to a camera module, an electronic device, and a method for controlling a camera module.

BACKGROUND

Currently, with advances in technologies and the continuous development of electronic devices, electronic devices become a necessary tool in scenarios such as work, entertainment, and social networking, and users' requirements for electronic devices are getting increasingly high. A camera module is used as an example, and a photographing capability of the electronic device becomes an important standard for measuring the performance of the electronic device. With the continuous development of the camera module of the electronic device, a quantity of cameras of the camera module is developed from a single camera to multiple cameras, so that the camera module can implement a zooming effect, and therefore, a photographing effect of the camera module is better.

However, generally, most current camera modules of electronic devices can only implement a low-multiple zooming function, but cannot implement a high-multiple zooming function. Therefore, the photographing effect of the camera module of the electronic device is poor, and cannot satisfy users.

SUMMARY

The present disclosure discloses a camera module, an electronic device, and a method for controlling a camera module.

According to a first aspect, an embodiment of the present disclosure provides a camera module, including:
  a first bracket;
  a lens, where the lens is disposed on the first bracket; and
  a camera assembly, where the camera assembly includes a camera and a second bracket, the camera is disposed on the second bracket, the second bracket is slidably sleeved on the first bracket, and an optical axis direction of the lens is parallel to an optical axis direction of the camera; where
  at least one of the camera and the lens can move between a first position and a second position; in a case that the camera or the lens is in the first position, a projection of the camera in the optical axis direction is staggered from a projection of the lens in the optical axis direction; and in a case that the camera or the lens is in the second position, the projection of the camera in the optical axis direction at least partially overlaps the projection of the lens in the optical axis direction.

According to a second aspect, an embodiment of the present disclosure provides an electronic device, including a device body and the foregoing camera module, where the camera module may be connected to the device body.

According to a third aspect, an embodiment of the present disclosure provides a camera module control method, performed by the foregoing camera module, where the control method includes:
  obtaining a target focal length of the camera module; and
  controlling, based on the target focal length, the camera or the lens to move between the first position and the second position, so that an actual focal length of the camera module is equal to the target focal length.

According to a fourth aspect, an embodiment of the present disclosure provides an electronic device, including a processor, a memory, and a computer program that is stored in the memory and that can run on the processor, and when the computer program is executed by the processor, steps of the foregoing control method are implemented.

According to a fifth aspect, an embodiment of this disclosure provides a readable storage medium, where the readable storage medium stores a program or an instruction, and the program or the instruction is executed by a processor to implement the steps of the control method according to the third aspect.

In the camera module disclosed in embodiments of the present disclosure, in a case that the camera or the lens is in the second position, the projection of the camera in the optical axis direction at least partially overlaps the projection of the lens in the optical axis direction. In this case, light passes through the lens first, and then enters the camera, so that a high-multiple zooming function can be implemented. In this way, a photographing effect of the camera module is better, and a photographing requirement of a user can be finally satisfied.

DETAILED DESCRIPTION

To make the objects, technical solutions, and advantages of the present disclosure clearer, the following clearly describes the technical solutions of the present disclosure with reference to embodiments of the present disclosure and corresponding accompanying drawings. Apparently, the described embodiments are only some rather than all embodiments of the present disclosure. Based on the embodiments of the present disclosure, all other embodiments obtained by a person of ordinary skill in the art without creative efforts shall fall within the protection scope of the present disclosure.

The technical solutions disclosed in the embodiments of the present disclosure are described in detail below with reference to the accompanying drawings.

Figure 1:
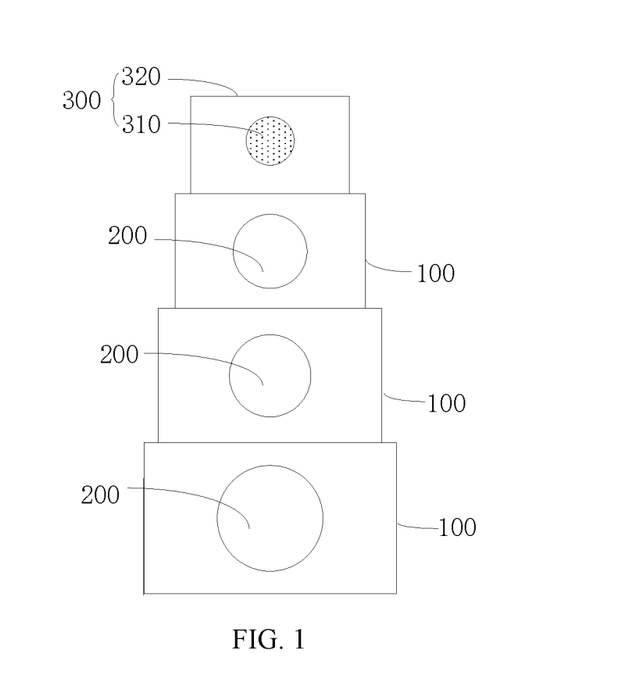
FIG. 1 to FIG. 4 are respectively schematic structural diagrams of a camera module according to an embodiment of the present disclosure in different states.
Figure 2:
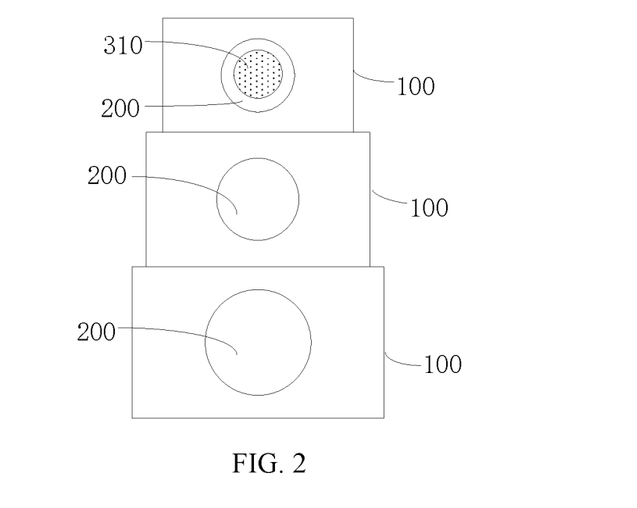
Figure 3:
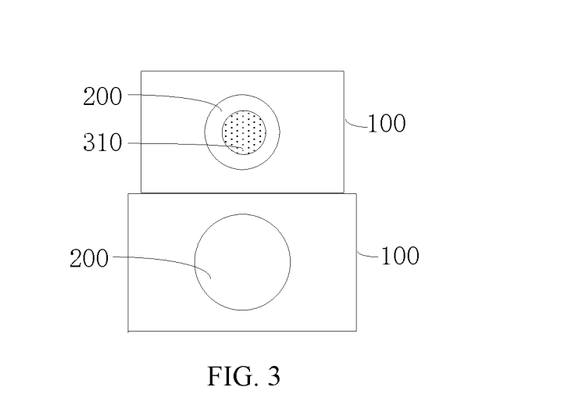
Figure 4:
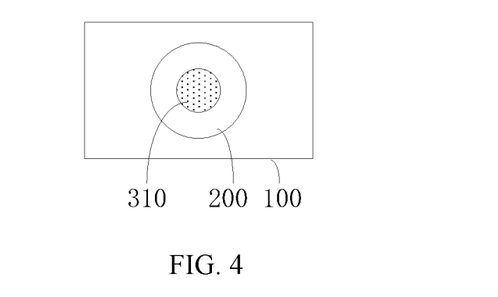
Figure 5:
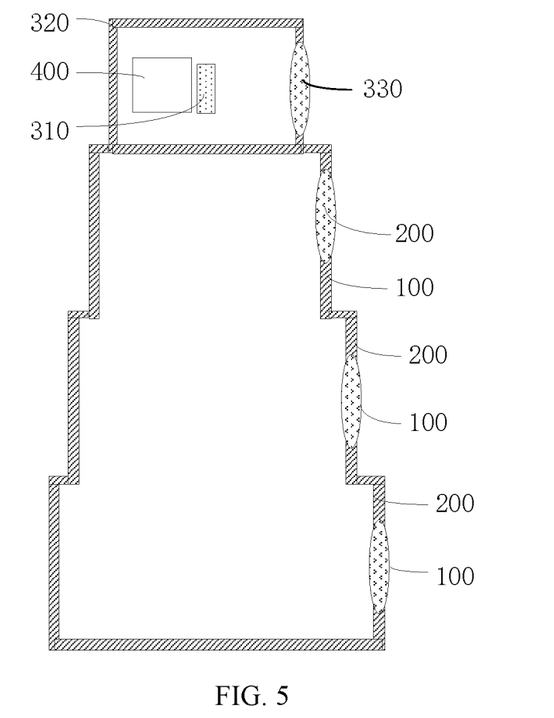
FIG. 5 is a sectional view of a camera module according to an embodiment of the present disclosure.
Figure 6:
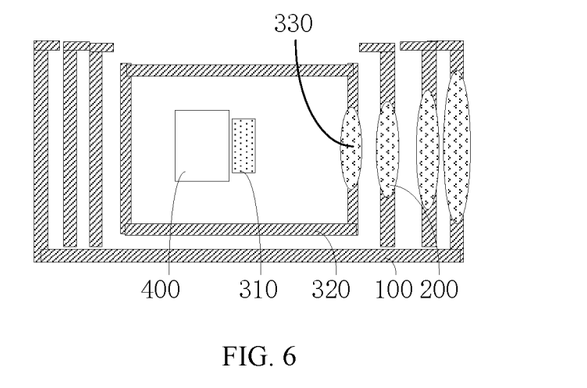
FIG. 6 is a sectional view of a camera module according to an embodiment of the present disclosure in another state.

As shown in FIG. 1 to FIG. 6, an embodiment of the present disclosure discloses a camera module, and the disclosed camera module includes a first bracket 100, a lens 200, and a camera assembly 300.

The first bracket 100 can provide a mounting position for another component of the camera module. The first bracket 100 may be a frame-shaped structure or a plate-shaped structure. A structure of the first bracket 100 is not limited in this embodiment of the present disclosure.

The lens 200 is one of important components of the camera module. In this embodiment of the present disclosure, the lens 200 is disposed on the first bracket 100. In some embodiments, a mounting hole may be disposed on the first bracket 100. The lens 200 may be installed in the mounting hole through bonding, threaded connection, clamping, magnetic suction connection, or the like. The lens 200 may be disposed in a removable structure, or may be disposed in a non-removable structure. Certainly, there are multiple manners in which the lens 200 is mounted on the first bracket 100. A manner of mounting the lens 200 on the first bracket 100 is not limited in this embodiment of the present disclosure.

The camera assembly 300 includes a camera 310 and a second bracket 320, and the camera 310 is disposed on the second bracket 320. In some embodiments, the second bracket 320 may be a frame-shaped structural member. In this case, the camera 310 may be disposed in an inner cavity of the second bracket 320. Correspondingly, an apparatus such as a circuit board for controlling the camera 310 to shoot may also be disposed in the inner cavity of the second bracket 320, so that a structure of the camera module is relatively compact. Meanwhile, a lens 330 opposite to the camera 310 may also be disposed on a surface of the second bracket 320, so that the camera assembly 300 can perform normal photographing, and the camera 310 can be protected.

In this embodiment of the present disclosure, the second bracket 320 and the first bracket 100 are slidably sleeved. In this case, the second bracket 320 and the first bracket 100 move relative to each other, so that the camera 310 and the lens 200 can be in relative positions. In this way, the camera 310 can face a working surface of the lens 200, and the camera 310 captures an image at a far distance by using the lens 200. Certainly, an optical axis direction of the lens 200 is parallel to an optical axis direction of the camera 310.

At least one of the camera 310 and the lens 200 may move between a first position and a second position. In other words, only a solution in which the camera 310 or the lens 200 is movable may be used, or a solution in which both the camera 310 and the lens 200 are movable may be used. In a case that the camera 310 or the lens 200 is in the first position, a projection of the camera 310 in the optical axis direction is staggered from a projection of the lens 200 in the optical axis direction. In a case that the camera 310 or the lens 200 is in the second position, the projection of the camera 310 in the optical axis direction at least partially overlaps the projection of the lens 200 in the optical axis direction. In an optional embodiment, in a photographing process, when a distance between a photographing subject and the camera module is relatively close, a user may control the camera 310 or the lens 200 to move in a direction in which a relative distance between the lens 200 and the camera 310 increases, so that the projection of the camera 310 in the optical axis direction is staggered from the projection of the lens 200 in the optical axis direction. When the distance between the photographing subject and the camera module is relatively far, the user may control the camera 310 or the lens 200 to move in a direction in which the relative distance between the lens 200 and the camera 310 decreases, so that the projection of the camera 310 in the optical axis direction at least partially overlaps the projection of the lens 200 in the optical axis direction, and finally, the camera module can shoot a clearer image of the photographing subject.

It can be learned from the foregoing content that, in the camera module disclosed in this embodiment of the present disclosure, in a case that the camera 310 or the lens 200 is in the second position, the projection of the camera 310 in the optical axis direction at least partially overlaps the projection of the lens 200 in the optical axis direction. In this case, light passes through the lens 200 first, and then enters the camera 310, so that a high-multiple zooming function can be implemented. In this way, a photographing effect of the camera module is better, and a photographing requirement of the user can be finally satisfied.

In an embodiment disclosed in the present disclosure, there may be at least two first brackets 100 and at least two lenses 200. The at least two lenses 200 may be disposed in a one-to-one correspondence on the at least two first brackets 100, and the at least two first brackets 100 may be slidably sleeved in sequence. In this case, the second bracket 320 may be slidably sleeved on the at least two first brackets 100. In a photographing process, the second bracket 320 and the at least two first brackets 100 move relative to each other, so that the projection of the camera 310 in the optical axis direction may at least partially overlap projections of the at least two lenses 200 in the optical axis direction. In this way, the camera module can implement a higher-multiple zooming function, and the camera module can shoot an image at a far distance. Certainly, this manner also makes the camera module more flexible. The camera module may adjust, based on a position of the photographing subject, a quantity of lenses 200 that face the camera 310, so that the camera module can obtain a proper target focal length, and finally obtain a relatively clear image.

In this embodiment of the present disclosure, one of the camera assembly 300 and the first bracket 100 may be disposed with a first limiting part, and the other may be disposed with a second limiting part. The second bracket 320 of the camera assembly 300 may be disposed with the first limiting part or the second limiting part described herein. In a working process, in a case that the camera 310 or the lens 200 is in the second position, the first limiting part may cooperate with the second limiting part through limiting, so that the projection of the camera 310 in the optical axis direction may stably at least partially overlap the projection of the lens 200 in the optical axis direction, thereby preventing the projection of the camera 310 in the optical axis direction from being staggered from the projection of the lens 200 in the optical axis direction and affecting a photographing effect of the camera module.

Correspondingly, in a case that there are at least two first brackets 100 and at least two lenses 200, a third limiting part may be disposed on one of two adjacent first brackets 100, and a fourth limiting part may be disposed on the other. In this case, in the two adjacent first brackets 100, when a projection of a lens 200 on one of the first brackets 100 in the optical axis direction at least partially overlaps a projection of a lens 200 on the other first bracket 100 in the optical axis direction, the third limiting part and the fourth limiting part may cooperate with each other through limiting, so that the two first brackets 100 can be maintained in the foregoing position, thereby preventing the projection of the lens 200 on one of the first brackets 100 in the optical axis direction and the projection of the lens 200 on other first bracket 100 in the optical axis direction from being staggered and affecting a photographing effect of the camera module.

The first limiting part and the second limiting part may be in multiple specific structures. For example, one of the first limiting part and the second limiting part may be a slot, the other of the first limiting part and the second limiting part may be a protrusion, and the slot and the protrusion may be limited; or at least one of the first limiting part and the second limiting part may be a magnetic suction part. In a case that the camera 310 or the lens 200 is in the second position, the first limiting part and the second limiting part may be connected through magnetic suction. Certainly, the first limiting part and the second limiting part may further have multiple specific structures. Specific structures of the first limiting part and the second limiting part are not limited in the present disclosure.

Correspondingly, in a case that the camera 310 or the lens 200 is in the first position, a corresponding limiting mechanism may also be disposed between the camera assembly 300 and the first bracket 100, to prevent the camera assembly 300 from being separated from the first bracket 100. In an optional solution, a first-gear protrusion may be disposed on one of the camera assembly 300 and the first bracket 100, and a second-gear protrusion may be disposed on the other. In a case that the camera 310 or the lens 200 is in the first position, the first-gear protrusion cooperates with the second-gear protrusion through limiting, to prevent the camera assembly 300 from being separated from the first bracket 100.

In this embodiment disclosed in the present disclosure, the camera module may further include a first driving mechanism 400. The first driving mechanism 400 may be connected to the first bracket 100 or the second bracket 320. In some embodiments, the first driving mechanism 400 may be connected to the first bracket 100, so that the first driving mechanism 400 may drive the first bracket 100 to move, to enable the lens 200 to move between the first position and the second position. The first driving mechanism 400 may also be connected to the second bracket 320, so that the first driving mechanism 400 may drive the second bracket 320 to move, to enable the camera 310 to move between the first position and the second position. In a photographing process, the first driving mechanism 400 may drive the camera 310 or the lens 200 to move between the first position and the second position, so that the camera module can easily implement a zooming function, thereby improving photographing experience of the user.

In this embodiment of the present disclosure, one of the first bracket 100 and the second bracket 320 may be disposed with a sliding groove, the other may be disposed with a sliding protrusion, and the sliding groove and the sliding protrusion may slidably cooperate with each other. In this case, in a process in which the first bracket 100 and the second bracket 320 move relative to each other, the sliding groove and the sliding protrusion can play a better guiding role, so that sliding between the first bracket 100 and the second bracket 320 is more stable, thereby preventing a jam phenomenon. In addition, the sliding groove and the sliding protrusion can further play a better limiting role, o prevent the first bracket 100 and the second bracket 320 from being staggered and affecting a photographing effect of the camera module.

Based on the camera module disclosed in this embodiment of the present disclosure, an electronic device is further disclosed in an embodiment of the present disclosure. The disclosed electronic device includes a device body and the camera module described in any one of the foregoing embodiments, and the camera module may be connected to the device body. The device body may include a housing, the housing is a peripheral component of the device body, and the housing can provide a mounting position for another component of the electronic device.

Further, in this embodiment of the present disclosure, the electronic device may further include a second driving mechanism. The second driving mechanism is disposed inside the housing of the device body, and the second driving mechanism may be connected to the first bracket 100 or the second bracket 320. In a photographing process, the second driving mechanism may drive the camera 310 or the lens 200 to move between the first position and the second position, so that the camera module can easily implement a zooming function. Based on this, in an assembly process, at least a part of the camera module may be exposed outside the housing, so that the camera module may work outside the housing. The camera module may alternatively be disposed inside the housing. In this case, a transparent area may be disposed inside the housing, and the camera module may face the transparent area, so that the camera module may work inside the housing.

The foregoing first driving mechanism 400 may also drive the camera 310 or the lens 200 to move between the first position and the second position. In some embodiments, only the first driving mechanism 400 or the second driving mechanism may be disposed to implement movement of the camera 310 or the lens 200, or both the first driving mechanism 400 and the second driving mechanism may be disposed. This is not limited in this embodiment of the present disclosure.

In an optional embodiment, the electronic device may further include a third driving mechanism, the housing of the device body may be disposed with an opening, the third driving mechanism may be disposed inside the housing, and the third driving mechanism may be connected to the camera module. In a photographing process, the third driving mechanism may drive at least a part of the camera module to extend out of the housing or retract to the housing by using the opening. In this case, when a photographing function of the camera module needs to be used, the third driving mechanism may be controlled to drive at least a part of the camera module to extend out of the housing through the opening, so that the camera module can work outside the housing, thereby improving the photographing effect of the camera module. When the photographing function of the camera module does not need to be used, the camera module may be located inside the housing. The camera module herein may implement front-facing photographing, or may implement rear-facing photographing. When the camera module implements front-facing photographing, the camera module does not occupy the screen space of the electronic device, thereby increasing a screen-to-body ratio of the electronic device. When rear-facing photographing is implemented, a structure such as a transparent area does not need to be disposed on the housing corresponding to the camera module, to improve the appearance quality of the electronic device, and in addition, a waterproof and dust-proof function can be implemented.

Certainly, the first driving mechanism 400, the second driving mechanism, and the third driving mechanism may be at least one of a hydraulic telescopic mechanism, a barometric telescopic mechanism, or a screw driving mechanism. Specific structures of the first driving mechanism 400, the second driving mechanism, and the second driving mechanism are not limited in the present disclosure. In some embodiments, when the first driving mechanism 400, the second driving mechanism, or the third driving mechanism is a screw driving mechanism, the screw driving mechanism may include a structure such as a motor, a screw, and a screw sleeve. The motor may drive the screw to rotate, and the screw sleeve is screwed with the screw, so that the screw may drive the screw sleeve to move, and the screw sleeve is connected to the first bracket 100, the second bracket 320, or the entire camera module, thereby driving the first bracket 100, the second bracket 320, or the entire camera module to move.

In an optional embodiment, the electronic device may have a first state and a second state. In a case that the electronic device is in the first state, the camera module may be separated from the device body. In this case, the camera module and the device body may independently work without mutual interference, or the device body may control the camera module to work by using a wireless module, so that the camera module can play a photographing function more freely. In a case that the electronic device is in the second state, the camera module may be connected to the device body. In this case, the device body and the camera module form a whole. The camera module may implement functions such as data transmission and charging by using the device body, or the device body may directly control the camera module to work.

Based on the camera module disclosed in this embodiment of the present disclosure, an embodiment of the present disclosure further discloses a method for controlling a camera module, and the disclosed control method includes:

S100: Obtain a target focal length of the camera module.

The target focal length herein may be obtained based on a distance between the camera body and the camera 310.

S200: Control the camera 310 or the lens 200 to move between a first position and a second position based on the target focal length, so that an actual focal length of the camera module is equal to the target focal length.

After the target focal length of the camera module is obtained, the camera 310 or the lens 200 may be controlled to move between the first position and the second position, and the camera 310 cooperates with the lens 200, so that the actual focal length of the camera module is equal to the target focal length, to enable the camera module to obtain a relatively clear image.

In the foregoing control method, in a case that the camera 310 or the lens 200 is in the second position, a projection of the camera 310 in an optical axis direction at least partially overlaps a projection of the lens 200 in the optical axis direction. In this case, light passes through the lens 200 first, and then enters the camera 310, so that a high-multiple zooming function can be implemented. In this way, a photographing effect of the camera module is better, and a photographing requirement of a user can be finally satisfied.

To facilitate the user to use the camera module, step S100 includes:

S110: Receive a first input performed by a user, where the first input is used to trigger a photographing operation.

S120: In response to the first input, perform scene recognition on an environment in which a photographing subject is located, to obtain the target focal length that matches a recognized scene.

In a process in which a user uses the camera module, the user may first trigger a photographing operation by clicking a photographing button or the like. In this case, the camera module may receive a first input performed by the user, and after obtaining the first input performed by the user, the camera module may perform scene recognition on the environment in which the photographing subject is located. In an optional solution, a human-machine interaction interface may be disposed on the camera module, and the user may enter a corresponding parameter on the human-machine interaction interface, so that the electronic device may perform, based on this parameter, scene recognition on the environment in which the photographing subject is located. In another optional solution, a sensing module may be disposed on the camera module, and the camera module may perform scene identification on the photographing subject by using the sensing module. Further, a correspondence table between the recognized scenario and the target focal length may be pre-stored on the electronic device. After a scene recognition operation is implemented, the target focal length that matches the recognized scenario may be obtained according to the correspondence table.

To enable the camera module to implement a higher-multiple zooming function, in an optional solution, there may be at least two first brackets 100 and at least two lenses 200, the at least two lenses 200 are disposed in a one-to-one correspondence on the at least two first brackets 100, the at least two first brackets 100 may be slidably sleeved in sequence, and an optical axis direction of the lens 200 is parallel to an optical axis direction of the camera 310. In this case, step S200 may include:

S210: Detect whether the actual focal length of the camera module is equal to the target focal length.

When the camera 310 and the lens 200 do not move relative to each other, the actual focal length may be different from the target focal length, and therefore, step S210 may be implemented. When the camera 310 and the lens 200 have moved relative to each other, but do not move in place, the foregoing actual focal length may be different from the target focal length, and therefore, step S210 may also be implemented.

S220: In a case that the actual focal length is not equal to the target focal length, detect whether a projection of each lens 200 in an optical axis direction is staggered from a projection of the camera 310 in the optical axis direction.

S230: In a case that the projection of each lens 200 in the optical axis direction is staggered from the projection of the camera 310 in the optical axis direction, control at least one lens 200 or the camera 310 to move in a first direction.

S240: In a case that a projection of at least one lens 200 in the optical axis direction at least partially overlaps the projection of the camera 310 in the optical axis direction, detect whether the projection of each lens 200 in the optical axis direction at least partially overlaps the projection of the camera 310 in the optical axis direction.

S250: In a case that the projection of each lens 200 in the optical axis direction at least partially overlaps the projection of the camera 310 in the optical axis direction, control the at least one lens 200 or the camera 310 to move in a second direction.

S260: In a case that a projection of the at least one lens 200 in the optical axis direction is staggered from the projection of the camera 310 in the optical axis direction, control the at least one lens 200 or the camera 310 to move in the first direction or the second direction.

It should be noted that the first direction is a direction in which a relative distance between the lens 200 and the camera 310 decreases, that is, a direction in which the lens 200 and the camera 310 approach each other, and the second direction is opposite to the first direction, that is, a direction in which the relative distance between the lens 200 and the camera 310 increases. When the foregoing solution is used, a state of the camera module may be more accurately controlled, to improve a photographing effect of the camera module.

Based on the control method in any one of the foregoing embodiments, an embodiment of the present disclosure further provides an electronic device. The electronic device may include:
- an obtaining module, configured to obtain a target focal length of a camera module; and
- a control module, configured to control a camera 310 or a lens 200 to move between a first position and a second position based on the target focal length, so that an actual focal length of the camera module is equal to the target focal length.

Further, with reference to the foregoing description, to enable the camera module to accurately obtain the target focal length, the obtaining module may include a receiving unit and a scene recognition unit. The receiving unit is configured to receive a first input performed by a user, and the scene recognition unit is configured to perform, in response to the first input, scene recognition on an environment in which a photographing subject is located, to obtain the target focal length that matches a recognized scene.

To enable the camera module to implement a higher-multiple zooming function, the control module may include:
- a first detection unit, configured to detect whether the actual focal length of the camera module is equal to the target focal length;
- a second detection unit, configured to: in a case that the actual focal length is not equal to the target focal length, detect whether a projection of each lens 200 in an optical axis direction is staggered from a projection of the camera 310 in the optical axis direction;
- a first control unit, configured to: in a case that the projection of each lens 200 in the optical axis direction is staggered from the projection of the camera 310 in the optical axis direction, control at least one lens 200 or the camera 310 to move in a first direction;
- a third detection unit, configured to: in a case that a projection of at least one lens 200 in the optical axis direction at least partially overlaps the projection of the camera 310 in the optical axis direction, detect whether the projection of each lens 200 in the optical axis direction at least partially overlaps the projection of the camera 310 in the optical axis direction;
- a second control unit, configured to: in a case that the projection of each lens 200 in the optical axis direction at least partially overlaps the projection of the camera 310 in the optical axis direction, control at least one lens 200 or the camera 310 to move in a second direction; and
- a fourth control unit, configured to: in a case that the projection of at least one lens 200 in the optical axis direction at least partially overlaps the projection of the camera 310 in the optical axis direction, control the at least one lens 200 or the camera 310 to move in the first direction or the second direction.

The first direction is a direction in which a relative distance between the lens 200 and the camera 310 decreases, and the second direction is opposite to the first direction, that is, a direction in which the relative distance between the lens 200 and the camera 310 increases.

An embodiment of the present disclosure further discloses an electronic device, including a processor, a memory, and a computer program that is stored in the memory and that can run on the processor. When the computer program is executed by the processor, steps of the control method in any one of the foregoing embodiments are implemented.

An embodiment of the present disclosure further discloses a computer-readable storage medium, where the computer-readable storage medium stores a computer program, and when the computer program is executed by a processor, steps of the control method in any one of the foregoing embodiments are implemented.

The processor is a processor in the electronic device in the foregoing embodiment. The readable storage medium includes a computer-readable storage medium such as a Read-Only Memory (ROM), a Random Access Memory (RAM), a magnetic disk, an optical disc, or the like.

The electronic device disclosed in the embodiments of the present disclosure may be a device such as a smartphone, a tablet computer, an e-book reader, a wearable device (for example, a smart watch), or a video game. A specific type of the electronic device is not limited in the embodiments of the present disclosure.

The foregoing embodiments of the present disclosure focus on describing differences between the embodiments, and different optimization features of the embodiments may be combined to form better embodiments provided that they are not contradictory. Considering brevity, details are not described herein again.

The foregoing descriptions are merely embodiments of the present disclosure, and are not intended to limit the present disclosure. For a person skilled in the art, various changes and variations may be made in the present disclosure. Any modification, equivalent replacement, and improvement made in the spirit and principles of the present disclosure shall be included in the scope of the claims of the present disclosure.

The invention claimed is:

1. A camera module, comprising:
   a first bracket;
   a lens, wherein the lens is disposed on the first bracket; and
   a camera assembly, wherein the camera assembly comprises a camera and a second bracket, the camera is disposed in an inner cavity of the second bracket, the second bracket is slidably sleeved inside the first bracket, and an optical axis direction of the lens is parallel to an optical axis direction of the camera;
   wherein at least one of the camera and the lens are configured to move between a first position and a second position; when the camera or the lens is in the first position, a projection of the camera in the optical axis direction is staggered from a projection of the lens in the optical axis direction; and when the camera or the lens is in the second position, the projection of the camera in the optical axis direction at least partially overlaps the projection of the lens in the optical axis direction.

2. The camera module according to claim 1, wherein there are at least two first brackets and at least two lenses, the at least two lenses are disposed in a one-to-one correspondence on the at least two first brackets, and the at least two first brackets are slidably sleeved in sequence.

3. The camera module according to claim 1, wherein one of the camera assembly and the first bracket is disposed with a first limiting part, the other is disposed with a second limiting part, and when the camera is in the second position, the first limiting part cooperates with the second limiting part through limiting.

4. The camera module according to claim 1, further comprising a first driving mechanism, wherein the first driving mechanism is connected to the first bracket or the second bracket, and the first driving mechanism is configured to drive the camera or the lens to move between the first position and the second position.

5. An electronic device, comprising a device body and the camera module according to claim 4, wherein the camera module is connected to the device body.

6. The electronic device according to claim 5, further comprising a second driving mechanism, wherein the device body comprises a housing, the second driving mechanism is disposed inside the housing, the second driving mechanism is connected to the first bracket or the second bracket, and the second driving mechanism is configured to drive the camera or the lens to move between the first position and the second position.

7. The electronic device according to claim 6, further comprising a third driving mechanism, wherein the device body comprises a housing, the housing is disposed with an opening, the third driving mechanism is disposed inside the housing, the third driving mechanism is connected to the camera module, and the third driving mechanism is configured to drive at least a part of the camera module to extend out of the housing or retract to the housing through the opening.

8. The electronic device according to claim 5, wherein the electronic device has a first state and a second state, and when the electronic device is in the first state, the camera module is separated from the device body; and when the electronic device is in the second state, the camera module is connected to the device body.

9. The camera module according to claim 1, wherein one of the first bracket and the second bracket is disposed with a sliding groove, the other is disposed with a sliding protrusion, and the sliding groove slidably matches the sliding protrusion.

10. A control method for controlling a camera module, wherein the camera module comprises:
  a first bracket;
  a lens, wherein the lens is disposed on the first bracket; and
  a camera assembly, wherein the camera assembly comprises a camera and a second bracket, the camera is disposed in an inner cavity of the second bracket, the second bracket is slidably sleeved inside the first bracket, and an optical axis direction of the lens is parallel to an optical axis direction of the camera;
  wherein at least one of the camera and the lens are configured to move between a first position and a second position; when the camera or the lens is in the first position, a projection of the camera in the optical axis direction is staggered from a projection of the lens in the optical axis direction; and when the camera or the lens is in the second position, the projection of the camera in the optical axis direction at least partially overlaps the projection of the lens in the optical axis direction,
  wherein the control method comprises:
  obtaining a target focal length of the camera module; and
  controlling, based on the target focal length, the camera or the lens to move between the first position and the second position, so that an actual focal length of the camera module is equal to the target focal length.

11. The control method according to claim 10, wherein the obtaining a target focal length of the camera module further comprises:
  receiving a first input performed by a user, wherein the first input is used to trigger a photographing operation; and
  in response to the first input, performing scene recognition on an environment in which a photographing subject is located, to obtain the target focal length that matches a recognized scene.

12. The control method according to claim 10, wherein there are at least two first brackets and at least two lenses, the at least two lenses are disposed in a one-to-one correspondence on the at least two first brackets, the at least two first brackets are slidably sleeved in sequence, and an optical axis direction of the lens is parallel to an optical axis direction of the camera,
  wherein the controlling, based on the target focal length, the camera or the lens to move between the first position and the second position, so that an actual focal length of the camera module is equal to the target focal length comprises:
  detecting whether the actual focal length of the camera module is equal to the target focal length;
  when the actual focal length is not equal to the target focal length, detecting whether a projection of each lens in the optical axis direction is staggered from a projection of the camera in the optical axis direction;
  when the projection of each lens in the optical axis direction is staggered from the projection of the camera in the optical axis direction, controlling at least one lens or the camera to move in a first direction;
  when a projection of at least one lens in the optical axis direction at least partially overlaps the projection of the camera in the optical axis direction, detecting whether the projection of each lens in the optical axis direction at least partially overlaps the projection of the camera in the optical axis direction;
  when the projection of each lens in the optical axis direction at least partially overlaps the projection of the camera in the optical axis direction, controlling at least one lens or the camera to move in a second direction; and
  when the projection of at least one lens in the optical axis direction is staggered from the projection of the camera in the optical axis direction, controlling at least one lens or the camera to move in the first direction or the second direction;
  wherein the first direction is a direction in which a relative distance between the lens and the camera decreases, and the second direction is opposite to the first direction.

13. An electronic device, comprising: a memory, a processor, and a computer program that is stored in the memory and that can run on the processor, wherein when executed by the processor, the computer program implements a control method for controlling a camera module, wherein the camera module comprises:
  a first bracket;
  a lens, wherein the lens is disposed on the first bracket; and
  a camera assembly, wherein the camera assembly comprises a camera and a second bracket, the camera is disposed in an inner cavity of the second bracket, the second bracket is slidably sleeved inside the first bracket, and an optical axis direction of the lens is parallel to an optical axis direction of the camera;
  wherein at least one of the camera and the lens are configured to move between a first position and a second position; when the camera or the lens is in the first position, a projection of the camera in the optical axis direction is staggered from a projection of the lens in the optical axis direction; and when the camera or the lens is in the second position, the projection of the camera in the optical axis direction at least partially overlaps the projection of the lens in the optical axis direction, wherein the control method comprises:
obtaining a target focal length of the camera module; and
controlling, based on the target focal length, the camera or the lens to move between the first position and the second position, so that an actual focal length of the camera module is equal to the target focal length.

14. The electronic device according to claim 13, wherein the obtaining a target focal length of the camera module further comprises:
receiving a first input performed by a user, wherein the first input is used to trigger a photographing operation; and
in response to the first input, performing scene recognition on an environment in which a photographing subject is located, to obtain the target focal length that matches a recognized scene.

15. The electronic device according to claim 13, wherein there are at least two first brackets and at least two lenses, the at least two lenses are disposed in a one-to-one correspondence on the at least two first brackets, the at least two first brackets are slidably sleeved in sequence, and an optical axis direction of the lens is parallel to an optical axis direction of the camera,
wherein the controlling, based on the target focal length, the camera or the lens to move between the first position and the second position, so that an actual focal length of the camera module is equal to the target focal length comprises:
detecting whether the actual focal length of the camera module is equal to the target focal length;
when the actual focal length is not equal to the target focal length, detecting whether a projection of each lens in the optical axis direction is staggered from a projection of the camera in the optical axis direction;
when the projection of each lens in the optical axis direction is staggered from the projection of the camera in the optical axis direction, controlling at least one lens or the camera to move in a first direction;
when a projection of at least one lens in the optical axis direction at least partially overlaps the projection of the camera in the optical axis direction, detecting whether the projection of each lens in the optical axis direction at least partially overlaps the projection of the camera in the optical axis direction;
when the projection of each lens in the optical axis direction at least partially overlaps the projection of the camera in the optical axis direction, controlling at least one lens or the camera to move in a second direction; and
when the projection of at least one lens in the optical axis direction is staggered from the projection of the camera in the optical axis direction, controlling at least one lens or the camera to move in the first direction or the second direction;
wherein the first direction is a direction in which a relative distance between the lens and the camera decreases, and the second direction is opposite to the first direction.

* * * * *